March 13, 1962
D. T. CAHILL
3,025,072
CLAMPING DEVICE
Filed Aug. 26, 1960
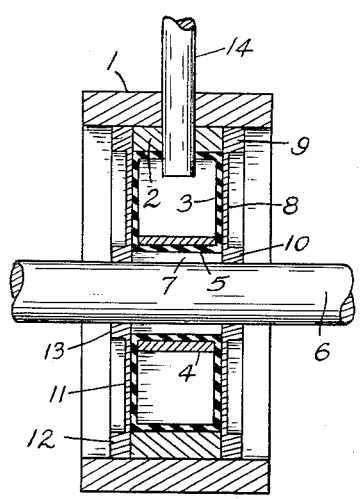
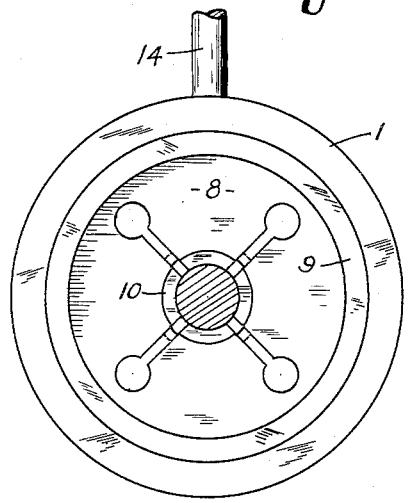
INVENTOR.

United States Patent Office 3,025,072
Patented Mar. 13, 1962

3,025,072
CLAMPING DEVICE
Daniel T. Cahill, Glen Head, N.Y., assignor to Specialties, Incorporated, Syosset, N.Y., a corporation of New York
Filed Aug. 26, 1960, Ser. No. 52,198
9 Claims. (Cl. 279—4)

This invention relates to clamping or locking devices.
Prior clamping devices have been deficient in that they have often imparted axial movement to rods, shafts, or other members or objects being clamped. In many cases it is important that the object being clamped, or released, shall not move in axial direction. Therefore it is an object of the present invention to provide a clamping device which may be actuated either to clamp or release a member or object without causing that object to be displaced in axial or other direction.

Another object is to provide a clamping device of simple construction.

An additional object is the provision of a clamping device which can be rapidly applied or released.

Other objects will be apparent in the specification.

In the drawings:

FIGURE 1 is a part sectional side elevation of my improved clamping device shown surrounding a shaft.

FIGURE 2 is an end elevation of the device of FIGURE 1.

In FIGURE 1 outer sleeve 1 may be a part of the clamping device or it may be a pipe or any other part of a machine or device of any kind. Ring or annulus 2 surrounds annular container 3 for holding air or other fluid. This container is made of any suitable flexible, expansible, or elastic material such as rubber, silicone material, or the like. The elastic liner or container 3 may be made of butyl 7 or other rubber of good air-retaining qualities. The liner encloses ring 4 which may be of steel or other suitable material. This ring may be molded in the rubber liner or it may be placed therein through an opening which is subsequently sealed.

The inner surface 5 of element 3 is spaced from shaft 6 around which the clamp is placed, leaving annular air gap 7. Relatively thin diaphragm 8 has thick peripheral ring 9 which is in contact with sleeve 1. This diaphragm also has integral or attached inner segmented ring 10 which is in contact with shaft 6. Similar diaphragm 11 having similar outer and inner rings 12 and 13, respectively, is placed on the opposite side of resilient element 3 which is vulcanized or otherwise attached to the diaphragms and to ring 2. Plunger 14 is movable toward or away from the axis of the device through openings in members 1 and 2. The plunger may also be movable through an air-tight peripheral aperture in member 3 or the plunger can be sealed or vulcanized to air container 3. Another construction which may be employed is to have the air container sealed and to compress the air therein by pressure of the plunger against the peripheral surface.

The diaphragms may be made of steel, Phosphor bronze, or other suitable metal or other material. These diaphragms are preferably slotted as indicated in FIGURE 2 in order to allow movement of the inner peripheral surfaces. The spacer 2 shown in FIGURE 1 separates the two diaphragms. A modification of the device is to have element 14 as a tube sealed to the bag or container 3 so that air or other fluid can be admitted to or withdrawn from the bag.

In operation, assuming that the plunger is a rod, the plunger is pushed inward toward the axis when it is desired to un-clamp the shaft 6. When this happens the bag or container will become distended in both axial directions and the diaphragms will be pushed outward, thereby turning slightly about rings 9 and 12 as bases and decreasing the effective inner radii of the segments 10 and 13. This results in the clamp releasing shaft 6 but any frictional drag of elements 10 in one direction is balanced by an equal and opposite drag of elements 13. Therefore the clamp will be released without axial displacement of the shaft or other object. The air gap 7 prevents the bag surface 5 from pushing against the shaft with resulting possible movement thereof.

Normally, the diaphragm ring elements 10 and 13 are pressed against the shaft in such manner that ring elements 10 clamp the shaft against movement in one direction and elements 13 clamp the shaft against movement in opposite direction. The expanded bag then releases the clamps as described. The construction could be such, however, that these clamping elements are normally out of contact with the shaft or at least do not clamp it and expansion of the bag will then force the diaphragms and elements 10 and 13 outward, thereby bringing them into clamping positions with respect to the shaft. Upon release of pressure in the bag the resiliency of the diaphragms would then move elements 10 and 13 toward each other to non-clamping positions.

The clamping force is dependent upon the shaft diameter, the stiffness of the diaphragms, the coefficient of friction between the materials in contact, and the locking or clamping action of the elements 10 and 13 and the shaft.

This clamping device may be operated very quickly by increasing or decreasing air pressure in bag 3. This is especially true since the bag is in contact with the diaphragms and elements 10 and 13 are either in contact with shaft 6 or closely adjacent thereto. Metal, plastics, or other material may be used for various parts of the device.

What I claim is:

1. In a clamping device, a pair of spaced diaphragms having openings therethrough for receiving an object to be clamped, means supporting outer peripheral surfaces of said diaphragms, an expansible container for fluid between said diaphragms, an opening through said container and aligned with said diaphragm openings, the boundary wall of said container opening being spaced from said object, a band within said container surrounding said wall, and means for varying the pressure of fluid in said conatiner.

2. In a clamping device, a pair of spaced diaphragms having coaxial holes therethrough for receiving an object to be clamped, means spacing said diaphragms adjacent the outer peripheries thereof, an elastic container for fluid situated between said diaphragms and attached thereto, said container having an opening therethrough coaxial with said diaphragm openings, and means for varying the pressure of fluid in said container.

3. The device as described in claim 2, and said container being also attached to said spacing means.

4. The device as described in claim 2, the peripheries of the diaphragm holes being normally in contact with said object to be clamped.

5. In a clamping device, a pair of spaced diaphragm elements having coaxial holes therethrough for receiving an object to be clamped, means spacing said diaphragm elements adjacent the outer peripheries thereof, an elastic container for fluid situated between said diaphragm elements, said container having an opening therethrough coaxial with said diaphragm element holes, and conduit means connected with the interior of said container for admission of fluid thereto.

6. In a clamping device, an outer ring, an inner ring in contact with an inner circumferential area of said outer ring and of less length than said outer ring, a pair of diaphragm elements in contact with the end annular surfaces of said inner ring and having coaxial openings in said diaphragm elements for passage therethrough of a member to be clamped, a circular elastic container placed between said diaphragm elements and having its peripheral surface in contact wtih said iner ring, and operating means passing through openings in said inner and outer rings and said container for varying fluid pressure in said container.

7. The device as described in claim 6, said elastic container being attached to said diaphragm elements and to said inner ring.

8. The clamping device as described in claim 6, the inner surface of said container being spaced from a member to be clamped.

9. The clamping device as described in claim 6, said operating means comprising a conduit for admission of fluid to said container.

References Cited in the file of this patent

UNITED STATES PATENTS

| | | |
|---|---|---|
| 2,826,420 | Klinger | Mar. 11, 1958 |
| 2,873,121 | Hahn | Feb. 10, 1959 |